US010140118B2

(12) United States Patent
Huang et al.

(10) Patent No.: US 10,140,118 B2
(45) Date of Patent: Nov. 27, 2018

(54) APPLICATION DATA SYNCHRONIZATION METHOD AND APPARATUS

(71) Applicant: Huawei Device (Dongguan) Co., Ltd., Dongguan (CN)

(72) Inventors: Xi Huang, Shenzhen (CN); Jianxin Ding, Shenzhen (CN); Huangwei Wu, Shenzhen (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 14/907,496

(22) PCT Filed: Mar. 19, 2014

(86) PCT No.: PCT/CN2014/073717
§ 371 (c)(1),
(2) Date: Jan. 25, 2016

(87) PCT Pub. No.: WO2015/139246
PCT Pub. Date: Sep. 24, 2015

(65) Prior Publication Data
US 2016/0378461 A1  Dec. 29, 2016

(51) Int. Cl.
*G06F 9/46* (2006.01)
*G06F 15/16* (2006.01)
(Continued)

(52) U.S. Cl.
CPC ............... *G06F 8/67* (2013.01); *G06F 8/61* (2013.01); *G06F 8/656* (2018.02); *G06F 9/441* (2013.01);
(Continued)

(58) Field of Classification Search
CPC .. G06F 21/602; G06F 9/44505; G06F 9/5077; G06F 9/54; G06F 9/455;
(Continued)

(56) References Cited

U.S. PATENT DOCUMENTS 5,600,822 A * 2/1997 Grice .................. G06F 9/52
712/16
5,845,293 A * 12/1998 Veghte .............. G06F 17/30174
(Continued)

FOREIGN PATENT DOCUMENTS

CN         1384436 A    12/2002
CN       101771548 A     7/2010
(Continued)

OTHER PUBLICATIONS

Konstantin Shvachko et al., The Hadoop Distributed File System, IEEE 2010, 978-1-4244-7153-9/10, [Retrieved on Jul. 17, 2018]. Retrieved from the internet: <URL: https://ieeexplore.ieee.org/stamp/stamp.jsp?tp=&arnumber=5496972> 10 Pages. (1-10) (Year: 2010).*
(Continued)

*Primary Examiner* — Anibal Rivera (57) ABSTRACT

The present invention discloses an application data synchronization method and an apparatus. When a first operating system and a second operating system are installed in a terminal, and a first application and a second application that have a same function are installed on the first operating system and the second operating system respectively, the method includes: when the second application runs on the second operating system, performing the function by using second application data, and updating the second application data, where the second application data is updated according to first application data, and the first application data is updated when the first application runs on the first operating system to perform the function; where the first application data and the second application data are stored in the terminal. By using the solutions, sharing of data of a same application between different systems is more convenient and less time-consuming.

21 Claims, 5 Drawing Sheets

(51) Int. Cl.
   *G06F 17/30*    (2006.01)
   *G06F 9/54*     (2006.01)
   *G06F 9/44*     (2018.01)
   *G06F 9/445*    (2018.01)
   *G06F 8/61*     (2018.01)
   *G06F 13/42*    (2006.01)
   *G06F 9/4401*   (2018.01)
   *G06F 8/656*    (2018.01)
   *G06F 9/50*     (2006.01)

(52) U.S. Cl.
   CPC ........ G06F 13/42 (2013.01); G06F 17/30345 (2013.01); *G06F 9/44563* (2013.01); *G06F 9/5077* (2013.01); *G06F 17/30174* (2013.01); *G06F 17/30575* (2013.01)

(58) Field of Classification Search
   CPC ............. G06F 9/45533; G06F 9/45558; G06F 9/45537; G06F 17/30575; G06F 9/52; G06F 13/40; G06F 13/10; G06F 9/44; G06F 9/06; G06F 9/445; G06F 17/30; G06F 21/575; G06F 21/6218; G06F 21/84; G06F 21/53; G06F 17/30292; G06F 17/30578; G06F 17/30174; G06F 17/30144; G06F 17/30067; G06F 17/30905; G06F 8/61; G06F 8/38
   See application file for complete search history.

(56) References Cited

U.S. PATENT DOCUMENTS

| | | | | |
|---|---|---|---|---|
| 6,968,370 B2* | 11/2005 | Wu | G06F 17/30067 | 707/E17.01 |
| 7,445,551 B1* | 11/2008 | Okada | A63F 13/00 | 463/43 |
| 7,581,223 B2* | 8/2009 | Harjula | G06F 9/4843 | 718/102 |
| 8,621,025 B2* | 12/2013 | Ridgard | H04L 67/1095 | 709/206 |
| 8,707,018 B1* | 4/2014 | Hooker | G06F 9/4411 | 713/1 |
| 8,898,443 B2* | 11/2014 | Reeves | G06F 13/14 | 713/1 |
| 9,710,148 B2* | 7/2017 | Lee | G06F 3/0488 | |
| 2003/0120706 A1* | 6/2003 | Harjula | G06F 9/45533 | 718/104 |
| 2003/0154187 A1* | 8/2003 | Hayakawa | G06F 17/30578 | |
| 2006/0010314 A1* | 1/2006 | Xu | G06F 9/45545 | 713/2 |
| 2007/0011672 A1* | 1/2007 | Bhide | G06F 8/61 | 717/174 |
| 2007/0177611 A1* | 8/2007 | Armstrong | G06F 21/53 | 370/395.52 |
| 2008/0098391 A1* | 4/2008 | Medvedev | G06F 9/44563 | 718/1 |
| 2008/0271017 A1* | 10/2008 | Herington | G06F 9/45558 | 718/1 |
| 2008/0271033 A1* | 10/2008 | Kamura | G06F 9/5077 | 718/104 |
| 2009/0064186 A1* | 3/2009 | Lin | G06F 9/54 | 719/315 |
| 2009/0064195 A1* | 3/2009 | Chin | G06F 9/45558 | 719/319 |
| 2009/0276772 A1* | 11/2009 | Garrett | G06F 9/455 | 718/1 |
| 2010/0115254 A1* | 5/2010 | Deng | G06F 9/441 | 713/1 |
| 2010/0122077 A1* | 5/2010 | Durham | G06F 1/3203 | 713/100 |
| 2011/0016299 A1* | 1/2011 | Galicia | G06F 9/45537 | 713/1 |
| 2011/0016301 A1* | 1/2011 | Galicia | G06F 9/45537 | 713/2 |
| 2011/0069699 A1* | 3/2011 | Balasaygun | H04M 1/2535 | 370/352 |
| 2011/0070873 A1* | 3/2011 | Balasaygun | H04M 1/2477 | 455/418 |
| 2011/0124327 A1* | 5/2011 | Balasaygun | H04M 1/2535 | 455/422.1 |
| 2011/0126216 A1* | 5/2011 | Galicia | G06F 9/45533 | 719/318 |
| 2012/0005691 A1* | 1/2012 | Wong | G06F 9/541 | 719/319 |
| 2012/0036345 A1* | 2/2012 | Chen | G06F 9/52 | 713/1 |
| 2012/0042156 A1* | 2/2012 | Ma | G06F 9/441 | 713/2 |
| 2012/0046054 A1* | 2/2012 | Celik | H04M 1/274516 | 455/466 |
| 2012/0081396 A1* | 4/2012 | Yusupov | H04L 67/1095 | 345/635 |
| 2012/0084542 A1* | 4/2012 | Reeves | G06F 13/14 | 713/1 |
| 2012/0089992 A1* | 4/2012 | Reeves | G06F 3/1431 | 719/318 |
| 2012/0110315 A1* | 5/2012 | Lee | G06F 9/45558 | 713/100 |
| 2012/0110496 A1* | 5/2012 | Lee | G06F 3/0488 | 715/778 |
| 2012/0154265 A1* | 6/2012 | Kim | G06F 21/84 | 345/156 |
| 2012/0154413 A1* | 6/2012 | Kim | H04M 1/72563 | 345/530 |
| 2012/0157044 A1* | 6/2012 | Kim | G06F 21/84 | 455/410 |
| 2012/0157165 A1* | 6/2012 | Kim | G06F 21/6218 | 455/566 |
| 2012/0159139 A1* | 6/2012 | Kim | H04M 1/72563 | 713/2 |
| 2012/0166679 A1* | 6/2012 | Zawacki | G06F 13/10 | 710/8 |
| 2012/0166997 A1* | 6/2012 | Cho | G06F 21/6218 | 715/778 |
| 2012/0173986 A1* | 7/2012 | Jung | G06F 9/451 | 715/733 |
| 2012/0246113 A1* | 9/2012 | Chen | G06F 17/30144 | 707/613 |
| 2012/0278750 A1* | 11/2012 | Abraham | G06F 9/4443 | 715/779 |
| 2012/0290822 A1* | 11/2012 | Hunt | G06F 21/575 | 713/1 |
| 2012/0309464 A1* | 12/2012 | Lim | H04M 1/72522 | 455/566 |
| 2013/0013991 A1* | 1/2013 | Evans | H04N 5/765 | 715/206 |
| 2013/0027364 A1* | 1/2013 | Kim | G06F 9/4443 | 345/204 |
| 2013/0054843 A1* | 2/2013 | Jan | G06F 3/1454 | 710/16 |
| 2013/0061250 A1* | 3/2013 | Kothandapani | G06F 9/44 | 719/320 |
| 2013/0080816 A1* | 3/2013 | Johnson | G06F 1/3206 | 713/401 |
| 2013/0132340 A1 | 5/2013 | Jing et al. | | |
| 2013/0138608 A1* | 5/2013 | Smith | G06F 17/30575 | 707/610 |
| 2013/0167111 A1* | 6/2013 | Moore | G06F 8/38 | 717/105 |
| 2013/0167159 A1* | 6/2013 | Ricci | H04W 4/90 | 719/319 |
| 2013/0227175 A1* | 8/2013 | Ting | G06F 13/10 | 710/8 |
| 2013/0227269 A1* | 8/2013 | Ting | H04L 9/12 | 713/100 |
| 2013/0227270 A1* | 8/2013 | Ting | G06F 9/4411 | 713/100 |

(56) References Cited

U.S. PATENT DOCUMENTS

| | | | | |
|---|---|---|---|---|
| 2013/0283298 | A1* | 10/2013 | Ali | G06F 9/5077 719/319 |
| 2013/0332519 | A1* | 12/2013 | Walker | H04L 67/10 709/203 |
| 2013/0346363 | A1* | 12/2013 | Arakawa | G06F 17/30575 707/610 |
| 2014/0006458 | A1* | 1/2014 | Hsieh | G06F 17/30292 707/803 |
| 2014/0074987 | A1 | 3/2014 | Martz et al. | |
| 2014/0122749 | A1* | 5/2014 | Ting | G06F 13/4022 710/14 |
| 2014/0164774 | A1* | 6/2014 | Nord | G06F 21/602 713/171 |
| 2014/0215016 | A1* | 7/2014 | Ke | G06F 3/00 709/217 |
| 2014/0380137 | A1* | 12/2014 | Zhang | G06F 17/30905 715/202 |
| 2015/0163286 | A1* | 6/2015 | Wen | H04L 41/0816 709/203 |
| 2015/0193194 | A1* | 7/2015 | Ahmed | G11B 27/10 700/94 |
| 2015/0254067 | A1* | 9/2015 | Nigam | G06F 8/61 717/175 |
| 2015/0324209 | A1* | 11/2015 | Hsu | G06F 9/441 713/2 |

FOREIGN PATENT DOCUMENTS

| | | |
|---|---|---|
| CN | 101996096 A | 3/2011 |
| CN | 102238265 A | 11/2011 |
| CN | 102346740 A | 2/2012 |
| CN | 102413246 A | 4/2012 |
| CN | 102945233 A | 2/2013 |
| CN | 103257889 A | 8/2013 |
| CN | 103309754 A | 9/2013 |
| CN | 103413089 A | 11/2013 |
| CN | 103544027 A | 1/2014 |

OTHER PUBLICATIONS

Marco Fillo et al., Architecture and Implementation of Memory Channel 2, Digital Technical Journal 1997, [Retrieved on Jul. 17, 2017] . Retrieved from the internet: <URL: ftp://eddie.linux-mips.org/pub/linux/mips/people/macro/DEC/DTJ/DTJP03/DTJP03PF.PDF> pp. 15 (27-41) (Year: 1997).*

Jing Cai, "Synchronous technology research and application Android mobile terminal data", Jan. 2011, 8 pages.

Wu Yi Jian, "Research and Implementation of Multimedia Data Synchronization on Mobile Devices" Master's thesis, Beijing University of Posts and Telecommunications, 2012, 72 pages.

* cited by examiner

APPLICATION DATA SYNCHRONIZATION METHOD AND APPARATUS

CROSS-REFERENCE TO RELATED APPLICATIONS

The present application claims priority under 35 U.S.C. § 365 to International Patent Application No. PCT/CN2014/073717 filed Mar. 19, 2014 which is incorporated herein by reference into the present disclosure as if fully set forth herein.

TECHNICAL FIELD

The present invention relates to the field of electronic technologies, and in particular, to an application data synchronization method and an apparatus.

BACKGROUND

With rapid development of electronic technologies, people's lives become increasingly closely linked with networks as well as electronic products with various functions. Nowadays, a variety of smart mobile operating systems meeting requirements of different users, such as the ANDRIOD, IOS, WINDOWSPHONE AND FIREFOX operating systems and browsers, come into popular use. User experience of different operating systems varies, and in the prior art, multiple operating systems may be installed on a same terminal. A user of the terminal can switch between the different operating systems according to a requirement, so that the user can experience different operating systems on a same device.

In addition, various APPS, based on different operating systems, that enrich and facilitate people's lives are also emerging. These APPs can meet different requirements of users in study, work, and daily life. When people use an APP, some application data is naturally generated. Application data refers to data that needs to be used when an application runs on a terminal. Application data includes but is not limited to an address book, a short message, a chat record of an instant chat tool, a contacts record, a browser bookmark, a browsing history, and the like. These APPs may exist on different operating systems, such as an address book on Android and an address book on Windows Phone; therefore, when a user uses an APP on a terminal supporting multiple systems, because each of the different operating systems exists independently, even for application data of a same user, multiple copies also need to be stored on the different operating systems. Redundancy of stored application data results in a waste of storage space; in addition, the user needs to repeatedly store same application data manually, which causes a complex operation process of application data synchronization and inconvenient implementation.

To resolve the foregoing problem, the prior art provides a solution, which specifically is synchronizing application data of an application on each operating system by means of a cloud server, for example, chat record migration of the WECHAT social media application, and application data synchronization of cloud storage services such as the DROPBOX file hosting service.

However, a problem existing in the prior art is that all applications need to use dedicated cloud servers, and a synchronization process (upload and download) needs to take a relatively long time, which leads to a poor user experience.

SUMMARY

Embodiments of the present invention provide an application data synchronization method and an apparatus, so as to resolve a problem in the prior art that when applications having a same function are installed on different operating systems, all applications need to use dedicated cloud servers, and a synchronization process (upload and download) needs to take a relatively long time, which leads to a poor user experience.

According to a first aspect, the present invention provides an application data synchronization method, where the method is applied to a terminal, a first operating system and a second operating system are installed in the terminal, a first application is installed on the first operating system, a second application is installed on the second operating system, and at least one same function is achieved by the first application and the second application, where the method includes:

when the second application runs on the second operating system, performing the function by using second application data, and updating the second application data, where the second application data is updated according to first application data, and the first application data is updated when the first application runs on the first operating system to perform the function, where the first application data and the second application data are stored in the terminal.

With reference to the first aspect, in a first possible implementation manner, the first application data is stored in a first file of the terminal, and the second application data is stored in a second file of the terminal, where the first file and the second file are different files.

With reference to the first possible implementation manner of the first aspect, in a second possible implementation manner, a process of updating the second application data according to the first application data specifically includes at least one of the following:

when the second operating system is started, if it is determined that an update time of the first file is later than an update time of the second file, using, according to a storage location of the first file and a storage location of the second file, the first application data stored in the first file to update the second application data stored in the second file; or when the first application data is updated, using, according to a storage location of the first file and a storage location of the second file, updated first application data stored in the first file to update the second application data stored in the second file.

With reference to the first aspect, in a third possible implementation manner, the first application data and the second application data are stored in a data sharing file of the terminal.

With reference to the third possible implementation manner of the first aspect, in a fourth possible implementation manner, a process of updating the second application data according to the first application data includes:

when the first application data is updated, storing updated first application data in the data sharing file; and generating the second application data after mapping the data sharing file to the second operating system.

According to a second aspect, the present invention further provides a terminal, where a first operating system and a second operating system are installed in the terminal, a first application is installed on the first operating system, a second application is installed on the second operating system, and at least one same function is achieved by the first application and the second application, where the terminal includes:

an update module, configured to: when the second application runs on the second operating system, perform the function by using second application data, and update the second application data, where the second application data is updated according to first application data, and the first application data is updated when the first application runs on the first operating system to perform the function; and a storage module, disposed in the terminal and configured to store the first application data and the second application data.

With reference to the second aspect, in a first possible implementation manner, the storage module is further configured to store the first application data in a first file, and store the second application data in a second file, where the first file and the second file are different files.

With reference to the first possible implementation manner of the second aspect, in a second possible implementation manner, the update module is further configured to: when the second operating system is started, if it is determined that an update time of the first file is later than an update time of the second file, use, according to a storage location of the first file and a storage location of the second file, the first application data stored in the first file to update the second application data stored in the second file; or when the first application data is updated, use, according to a storage location of the first file and a storage location of the second file, updated first application data stored in the first file to update the second application data stored in the second file.

With reference to the second aspect, in a third possible implementation manner, the storage module is configured to store the first application data and the second application data in a data sharing file.

With reference to the third possible implementation manner of the second aspect, in a fourth possible implementation manner, the update module is further configured to: when the first application data is updated, store updated first application data in the data sharing file; and generate the second application data after mapping the data sharing file to the second operating system.

In a third aspect, the present invention further provides another terminal, where a first operating system and a second operating system are installed in the terminal, and a processor and a memory are disposed in the terminal, where system data corresponding to the first operating system and system data corresponding to the second operating system are stored in the memory, where a first application is installed on the first operating system, a second application is installed on the second operating system, and at least one same function is achieved by the first application and the second application;

the processor is configured to call the system data to correspondingly run the first operating system or the second operating system, and further configured to: when the second application runs on the second operating system, perform the function by using second application data, and update the second application data, where the second application data is updated according to first application data, and the first application data is updated when the first application runs on the first operating system to perform the function; and the memory is further configured to store the first application data and the second application data.

With reference to the third aspect, in a first possible implementation manner, the memory is further configured to store the first application data in a first file, and store the second application data in a second file, where the first file and the second file are different files.

With reference to the first possible implementation manner of the third aspect, in a second possible implementation manner, the processor is further configured to: when the second operating system is started, if it is determined that an update time of the first file is later than an update time of the second file, use, according to a storage location of the first file and a storage location of the second file, the first application data stored in the first file to update the second application data stored in the second file; or when the first application data is updated, use, according to a storage location of the first file and a storage location of the second file, updated first application data stored in the first file to update the second application data stored in the second file.

With reference to the third aspect, in a third possible implementation manner, the memory is further configured to store the first application data and the second application data in a data sharing file.

With reference to the third possible implementation manner of the third aspect, in a fourth possible implementation manner, the processor is further configured to: when the first application data is updated, store updated first application data in the data sharing file; and generate the second application data after mapping the data sharing file to the second operating system.

In the solutions provided by the embodiments of the present invention, if a same application is installed on two systems of a terminal, it is detected whether data of the application on either system is updated, and if the data is updated, updated data is synchronized to a corresponding application on the other system; therefore, sharing of the data of the same application between different systems is more convenient and less time-consuming, which resolves a current problem that data sharing between multiple systems on a same terminal needs to use dedicated cloud servers, a synchronization process (upload, download) is generally time-consuming, and user experience is poor.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

To resolve the problem in the prior art, the present invention provides an application data synchronization method, where the method is applied to a terminal, a first operating system and a second operating system are installed in the terminal, a first application is installed on the first operating system, a second application is installed on the second operating system, and at least one same function is achieved by the first application and the second application, where the method includes:

when the second application runs on the second operating system, performing the function by using second application data, and updating the second application data, where the second application data is updated according to first application data, and the first application data is updated when the first application runs on the first operating system to perform the function, where the first application data and the second application data are stored in the terminal.

In the prior art, for some terminals on which two systems are installed, some same applications are installed on the two systems in many cases, and because, for example, the two systems cannot be used simultaneously and data formats of the two systems are different, even if two same applications are installed on the two systems, the two applications need to use dedicated cloud servers to share data by using a synchronization process (upload, download); as a result, such configuration causes a problem of difficult data synchronization. In the solutions provided by the embodiments of the present invention, if a same application is installed on two systems of a terminal, it is detected whether data of the application on either system is updated, and if the data is updated, updated data is synchronized to a corresponding application on the other system; therefore, sharing of the data of the same application between different systems is more convenient and less time-consuming.

To describe the solutions provided by the present invention more clearly, the following further describes in detail the embodiments of the present invention with reference to the accompanying drawings in the specification.

Embodiment 1

According to the solution provided by the embodiment of the present invention, application data sharing between two operating systems is achieved by means of internal sharing of a terminal, and therefore, when data of a first application that requires data sharing on either operating system is updated, updated data may be shared with the other operating system (a second application having a same function with the first application is installed in the other operating system).

In addition, when the other operating system is started and the application is used, if it is found that the operating system is updated, data of the second application may also be updated by using updated data of the first application.

Figure 1:
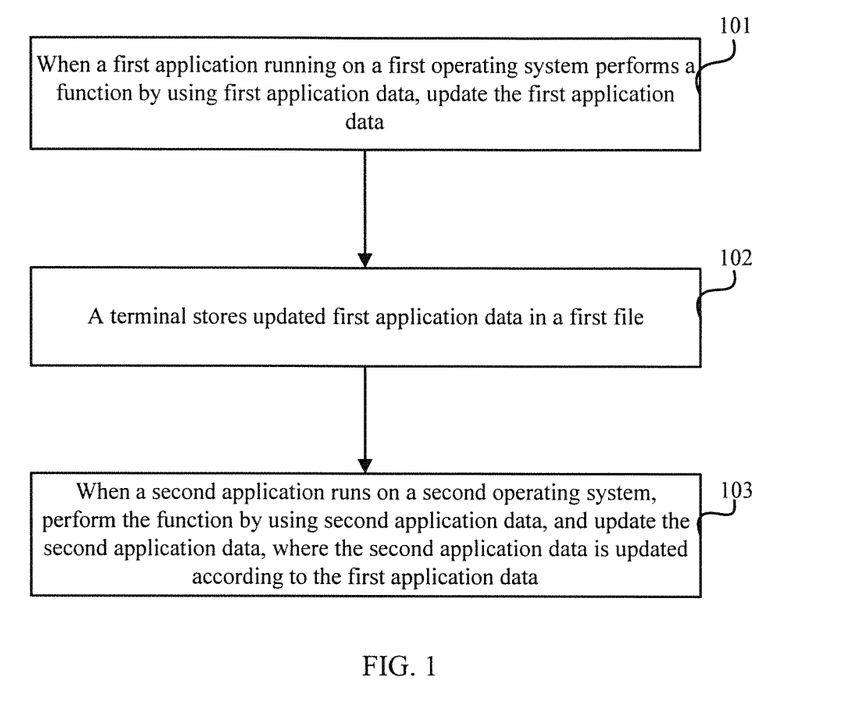
FIG. 1 is a schematic flowchart of an application data synchronization method according to Embodiment 1 of the present invention.

As shown in FIG. 1, based on the foregoing possible implementation manners of data updating of two systems, the embodiment of the present invention provides an application data synchronization method, where the method is applied to a terminal, a first operating system and a second operating system are installed in the terminal, a first application is installed on the first operating system, a second application is installed on the second operating system, and at least one same function is achieved by the first application and the second application.

In the embodiment, assuming that the first application on the first operating system first performs data updating, and the terminal needs to synchronize updated data to the second application on the second operating system, a specific implementation may be:

Step 101: When the first application running on the first operating system performs the function by using first application data, update the first application data.

In the embodiment of the present invention, the first file is a database file that supports running of the first application, and updated data generated by updating the first application data is also stored in the first file. For example, if the first application is Contacts, the first file is an address book database file that is stored in the terminal, and the first application data is various address book entries (for example, name, contact information, and address) entered by a user.

Step 102: The terminal stores updated first application data in a first file.

Step 103: When the second application runs on the second operating system, perform the function by using second application data, and update the second application data, where the second application data is updated according to the first application data, and the first application data is updated when the first application runs on the first operating system to perform the function.

In the embodiment of the present invention, because the terminal achieves data sharing and synchronization by performing local operations, both original data and updated data of the first application and the second application are stored in a local storage device of the terminal.

In the embodiment of the present invention, the updated data of the first application exists on the first operating system, and the updated data is stored in the first file; therefore, when the second application runs on the second operating system, if the second application data is updated according to the first application data, the second application running on the second operating system can share the data that is updated when the first application runs, thereby achieving a beneficial effect that the second operating system shares the data with the first operating system.

The method provided by the present invention is intended to achieve data sharing between different operating systems; therefore, for data storage manners of different operating systems, the following provides two specific implementation manners of the solution of the present invention, specifically including:

Embodiment 2

In a first data storage manner, data corresponding to the first application and data corresponding to the second application are separately stored in data of the two operating systems, that is, the first application data is stored in a first file of the terminal, and the second application data is stored in a second file of the terminal, where the first file and the second file are different files. In the embodiment, the first file is stored in a first storage location of the terminal, and the second file is stored in a second storage location of the terminal, where the first storage location is different from the second storage location. Running of the first application installed on the first operating system is supported by the first file stored in the first location, and running of the second application is supported by the second file stored in the second location. In the embodiment, a specific implementation of updating of the files and the data may be as follows:

First, because the second file and the first file are separately stored, if the manner of Embodiment 1 is used as an example, the terminal first generates the first application data by using the first application of the first operating system, and stores the first application data by using the first file on the terminal. A specific implementation of updating the second application data according to the first application data may include the following manners:

1. When the second operating system is started, the terminal updates all data that is generated when the first operating system uses the first application into the second file at a time. The updating of the second application data according to the first application data specifically includes:

when the second operating system is started, if it is determined that an update time of the first file is later than an update time of the second file, using, according to a storage location of the first file and a storage location of the second file, the first application data stored in the first file to update the second application data stored in the second file.

A specific implementation manner of data updating may be: comparing the update time of the first file with the update time of the second file to determine that the update time of the first file is later, updating the second application data by using the first application data stored in the first file, and storing updated second application data in the second file.

A specific method for comparing update time of record files may be: acquiring storage locations, of files that record two piece of storage application data, on the terminal, separately reading update time of the two files, and performing comparison; or directly comparing, by using an update time record in a storage configuration file, update time of two files storing application data.

For example, the first file is read in the first storage location, and it is determined that the update time of the first file on the first operating system is 2011-02-12 15:43:00, and the second file is read in the second storage location, and it is determined that the update time of the second file on the second operating system is 2011-02-11 20:00:00. After comparing the update time of the first file with the update time of the second file, it is determined that the update time of the first file is later, that is, latest application data is stored in the first file; therefore, the second application data stored in the second file is updated by using the first application data stored in the first file, so that both the data on the two operating systems can be kept latest.

Therefore, for the terminal, after being formatted into a data format of the second operating system, the first application data in the first file can be stored in the second file.

2. Because the storage locations of both the first file and the second file are fixed, when the first application data stored in the first file is being updated, updated data may be synchronized in real time into the second operating system. Therefore, a specific implementation of updating the second application data according to the first application data may also be:

when the first application data is updated, using, according to a storage location of the first file and a storage location of the second file, updated first application data stored in the first file to update the second application data stored in the second file.

In the foregoing two manners, the second application data needs to be updated by using the first application data. Because data formats of the two operating systems are different and content of updated data is also different, in the embodiment of the present invention, the data may be updated in the following manners, specifically including:

Because the operating systems are different, the data formats corresponding to the applications running on the different operating systems are also different. To achieve synchronous update of data, formats of to-be-synchronized data need to be synchronized first. In this way, an implementation of updating the second application data according to the first application data includes:

determining a first data format corresponding to the first application data and a second data format corresponding to the second application data, detecting whether the first data format and the second data format is the same, and if the first data format is different from the second data format, converting the first application data format into the second data format; and updating the second application data by using the first data in the second application data format.

In addition, according to the embodiment of the present invention, after the data formats are unified, for data that needs to be synchronized, data updating may be performed in an incremental addition manner or in an overwriting manner. A specific implementation manner of updating the second application data by using the first application data in the second application data format may be:

overwriting the second application data by using the first application data in the second data format; or comparing the first application data in the second data format with the second application data, determining difference data between the first application data in the second data format and the second application data in the second data format, and adjusting the second application data by using the difference data.

Considering that on two operating systems, there may still be a problem of different data formats even for applications implementing a same function; therefore, in the foregoing synchronous data updating manner, format unification or conversion are performed on to-be-synchronized data before data is synchronized, thereby resolving a problem that data cannot be directly synchronized between operating systems having different data formats.

Figure 2:
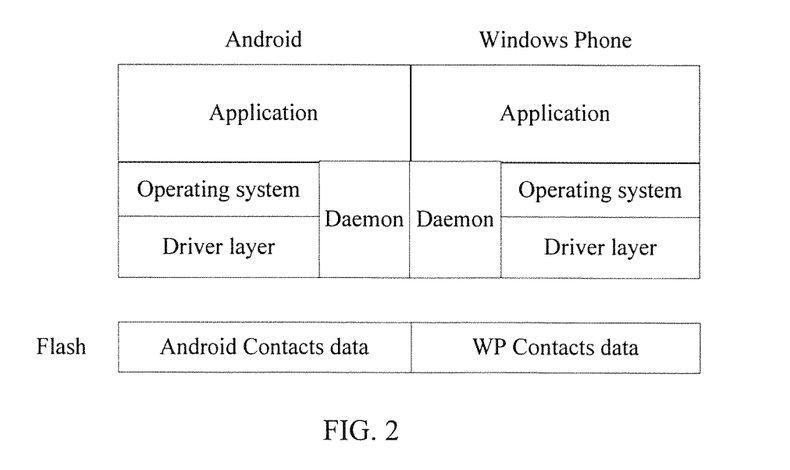
FIG. 2 is a schematic structural diagram of a terminal applicable to a method according to Embodiment 2 of the present invention.
Figure 3:
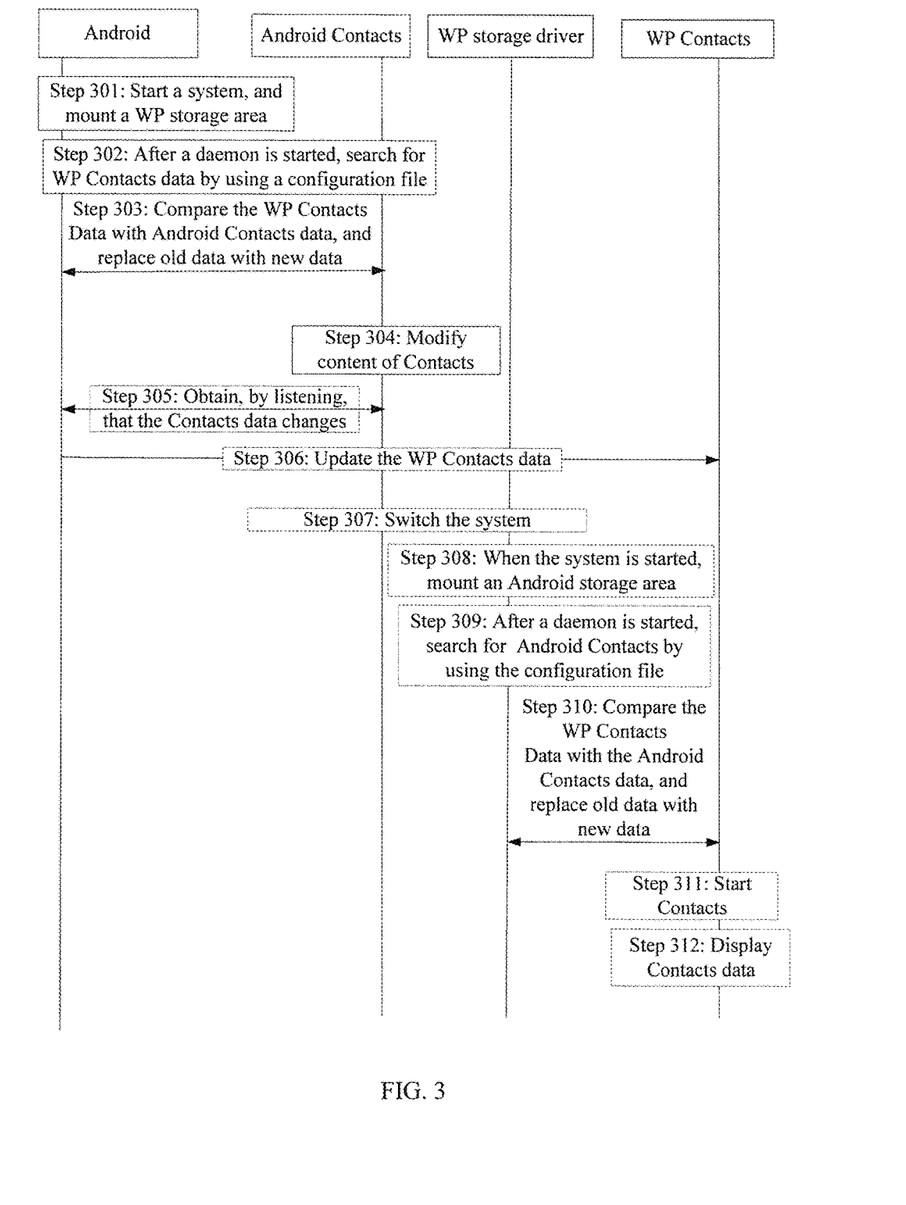
FIG. 3 is a schematic flowchart of an application data synchronization method according to Embodiment 2 of the present invention.

To describe a specific implementation process of the foregoing method provided by the embodiment of the present invention more clearly, the following further describes in detail the method provided by the embodiment of the present invention by using a terminal structure shown in FIG. 2 and a procedure of a data synchronization method shown in FIG. 3. The method specifically includes the following steps:

Because information such as a storage location and a format of original application data on a system is known, in the solution provided by the embodiment of the present invention, a daemon process may be implemented separately on a first operating system (for example, an ANDROID operating system) and a second operating system (for example, a WP system). When the ANDROID operating system is started, a storage area of the WP system is mounted, the storage location of the original application data is determined (that is, both a storage location of first application data on the first operating system and a storage location of second application data on the second operating system may be acquired), and the original application data on the two systems is synchronized. In the embodiment, if applications having a same function are Contacts, a daemon actively listens to a change in data such as an address book, a call record, and an SMS message.

The daemon determines a storage location of WP original application data by using a storage configuration file. After a WP version is updated, if the storage location of the Contacts data is changed, the configuration file is updated.

In the foregoing application environment, specific steps of a procedure for implementing an application data synchronization method according to the embodiment of the present invention include (as shown in FIG. 3):

Step 301: A terminal starts an ANDROID operating system, and mounts a storage area of a WP system.

Step 302: After a daemon is started, read a storage configuration file, determine a location of Contacts data of the WP system (namely, a storage location of first application data), and read the WP Contacts data (namely, a storage location of second application data) in the WP storage area.

The storage configuration file stores related information, such as storage locations of data files of applications having a same function on the two operating systems.

Step 303: The daemon reads ANDROID operating system address book data, compares the ANDROID operating system address book data with the WP Contacts data, performs format conversion on data that needs to be converted and then replaces old data.

In this step, a specific manner of replacing the old data is: detecting which Contacts data between the ANDROID operating system Contacts data and the WP Contacts data has a later update time, and using data that is updated later as new data to replace the old data.

Step 304: Receive a user operation, where the operation is opening an ANDROID operating system Contacts application, modifying (or adding) information of a contact and saving the information.

Step 305: The daemon obtains, by listening, that the ANDROID operating system Contacts data changes. For example, a new contact is added.

Step 306: Update the WP Contacts data in the WP storage area by using the storage configuration file.

By performing the foregoing steps, an objective that needs to be achieved in the present invention can be realized, that is, achieving data sharing between two operating systems. Because two operating systems are installed in the terminal mentioned in the present invention, a specific implementation after switching of operating systems is further described in detail in the embodiment:

Step 307: On the ANDROID operating system, choose to switch to the WP system.

Step 308: Restart the device, and boot into the WP system by using a bootloader, and mount an ANDROID operating system storage area.

Step 309: After the daemon is started, search for the ANDROID operating system Contacts data in the ANDROID operating system storage area by using the storage configuration file.

Step 310: Find the WP Contacts data, compare the ANDROID operating system Contacts data with the WP Contacts data, and replace old data with new data.

Step 311: Start the WP Contacts, and load the Contacts data.

In the embodiment of the present invention, to achieve data synchronization between the two operating systems, related information of various applications on the two operating systems needs to be recorded by using the storage configuration file, and content recorded in the storage configuration file includes:

The storage configuration file is used to record storage details, such as a storage location, a storage format, a size, and a file system, of data of applications, such as a Contacts on an ANDROID operating system and a WP system. Because a device manufacturer can acquire a storage location of data of a system application on each system on a device, a storage configuration file can be preconfigured in the device. Once an operating system version is upgraded and a data storage location is changed, update can be performed in a manner such as OTA. The following is an example of the storage configuration file. In a specific implementation, reference may be made to this example. This example, however, is not intended to limit Embodiment 1. Persons of ordinary skill in the art may perform extension by using other means, for example, using a JSON format.

```
<file-name>storage_config</filename>
    <system name="windows phone">/System name is Windows
Phone. Content in a system label is description for a system/
        <system-version>8.0</system-version    >/System    version:
indicates that a system version is Windows Phone 8/
        <file-system-format>NTFS</file-system-format>/File
system format: indicates that a file system format is NTFS/
    </system>
    <app-list>/Application list: indicates data storage details
of original applications in a system/
        <app    name="contacts"    index="1">/Application name is
Contacts, index is 1, "sms" and "phone" in the following are
corresponding to this/
        <store-location>c:\program
data\contacts\data\contacts.db</store-location>/Indicating    a
storage location of Contacts/
        <last-modified>2013-11-18@21:23:32</last-modified>/Indicating
the last modification time of Contacts/
    </app>
    <app name="sms" index="2">
        <store-location>c:\program
data\sms\data\sms.db</store-location>
        <last-modified>2013-11-17@12:14:54</last-modified>
    </app>
    <app name="phone" index="3">
        <store-location>c:\program
data\phone\data\phone.db</store-location>
        <last-modified>2013-11-18@09:23:15</last-modified>
    </app>
</app-list>
```

Method for monitoring a change of Contacts data:

A daemon on Android acquires a storage location of the Contacts data on an Android system by searching a packages.list file on the ANDROID operating system for a storage location of application program data, and monitors the Contacts data, which can be implemented by using an inotify mechanism on the ANDROID operating system, but use of other manners is not limited.

An example of content of the packages.list file:

| | | |
|---|---|---|
| com.google.android.location | 10057 | 0 |
| /data/data/com.google.android.location | | |
| com.northpark.pushups | 10029 | 0 |
| /data/data/com.northpark.pushups | | |
| com.northpark.situps | 10046 | 0 |
| /data/data/com.northpark.situps | | |
| com.DefiantDev.SkiSafari | 10059 | 0 |
| /data/data/com.DefiantDev.SkiSafari | | |
| com.android.defcontainer | 10036 | 0 |
| /data/data/com.android.defcontainer | | |

In the example of the content of the packages.list file, each line represents a piece of related information of a data sharing application, for example, an application name (com.google.android.location), an application identifier (10057), and a storage location of data corresponding to the application (data/data/com.google.android.location).

Embodiment 3

In a second data storage manner, data corresponding to applications that have a same function in two operating systems and that need to share data is stored in one file, that is, the first application data and the second application data are stored in a data sharing file of the terminal. In the embodiment, a specific implementation of updating of the file and the application data may be:

mapping, by the first operating system, the first file to a file system of the first operating system according to the data sharing file; and when the first operating system detects a request for storing the first application data in the first file by the first application program, storing, by the first operating system, the first data in the data sharing file according to a preset format.

Because a data file on a file system of an operating system is used by an application program, and is mapped to the file system of the operating system by a driver of the operating system according to a data sharing file stored in a memory, the first file is mapped to the file system of the first operating system by the first operating system according to the data sharing file.

The second file is mapped to a file system of the second operating system by the second operating system according to the data sharing file.

In the embodiment, only one data sharing file needs to be stored; therefore, when each operating system runs an installed application, the stored data sharing file, before being used, needs to be loaded by using a specific driver. Therefore, in the embodiment of the present invention, a process of updating the second application data according to the first application data includes:

when the first application data is updated, storing updated first application data in the data sharing file; and generating the second application data after mapping the data sharing file to the second operating system.

To enable the first operating system to subsequently use updated data generated by the second operating system, after the performing the function by using the second file and updating the second application data, the method further includes:

when it is detected, on the second operating system, a request for storing the second application data in the second file by the second application program, storing the second application data in the data sharing file according to a preset format, so that the shared file can be updated in real time.

In addition, to achieve data compatibility between the first operating system and the second operating system, before the storing updated second application data in the data sharing file, the method further includes: converting the second application data from the second data format to the data format of the first file.

Further, to reduce data redundancy and save storage sources of the terminal, after the second operating system exits, the terminal deletes the second file.

Figure 4:
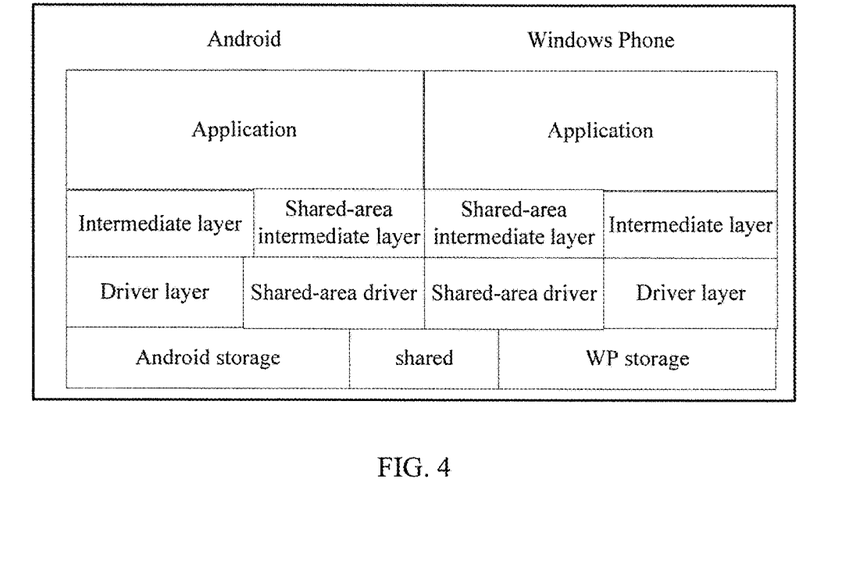
FIG. 4 is a schematic structural diagram of a terminal applicable to a method according to Embodiment 3 of the present invention.
Figure 5:
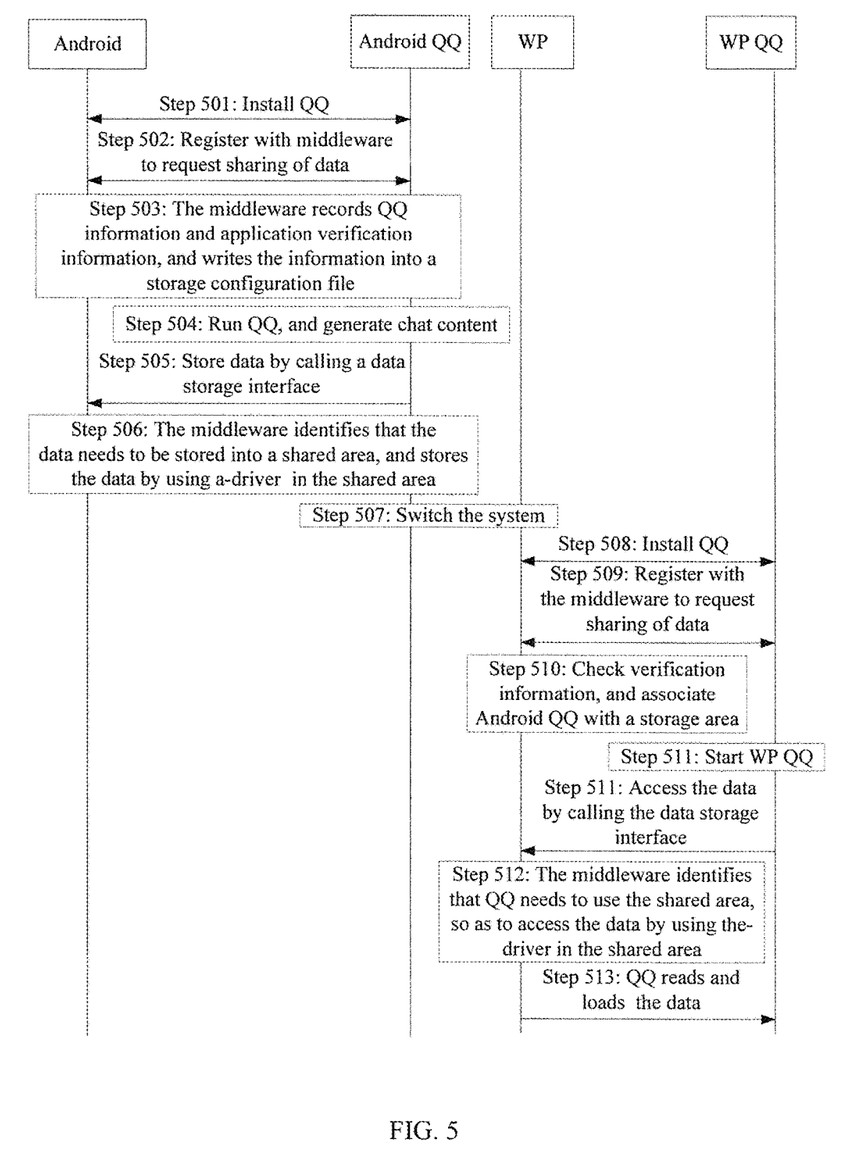
FIG. 5 is a schematic flowchart of an application data synchronization method according to Embodiment 3 of the present invention.

To describe a specific implementation of the foregoing method provided by the embodiment of the present invention more clearly, the following further describes in detail the method provided by the embodiment of the present invention by using a terminal structure shown in FIG. 4 and a procedure of a data synchronization method shown in FIG. 5. The method specifically includes the following steps:

The solution provided by the embodiment of the present invention may be implemented on a first operating system (such as an ANDROID operating system) and a second operating system (such as a WP system). To implement monitoring of data on the first operating system and the second operating system by a terminal, a driver and intermediate layer software may be separately added to the ANDROID operating system and the WP system. When applications that need to share data are being installed, the applications are registered with the intermediate layer, and the intermediate layer software writes application registration information into a storage configuration file in a shared storage area. The intermediate layer software is responsible for processing all data access operations, and performing filtering according to the storage configuration file. A driver in the shared area is responsible for mapping a data sharing file of registered software to a file system of a current operating system, so that the registered software accesses application data.

When the terminal is switched to the WP system and an application reads data, it is also determined, by using the intermediate layer software, whether to read the data from the shared storage area, and it is then determined whether to map the data sharing file to a file system of the WP system by using the driver in the shared area, so that the application can read and write the data.

In the embodiment, an ANDROID operating system, a WP system, a first ANDROID operating system application Android QQ, and a second application WP QQ are used as an example for describing the method provided by the embodiment of the present invention, where corresponding first application data is data corresponding to Android QQ, and second application data is data corresponding to WP QQ. Steps of a specific procedure include (as shown in FIG. 5):

Step 501: Install QQ on an ANDROID operating system.

Step 502: QQ registers with middleware as an application that needs to share data, and provides information about the application, verification information for using application data, and the like, where the verification information is used to ensure that only QQ can use the application data on a WP system.

Step 503: The middleware records a registration request from QQ, saves the verification information of QQ, records the registration request and the verification information in a storage configuration file, and stores the storage configuration file in a shared area.

Step 504: Run QQ, and generate information such as a chat record.

Step 505: Store the chat record by using a data storage interface.

Step 506: The middleware identifies, according to the storage configuration file, that QQ needs to store the chat record into the shared area, and maps a data sharing file of QQ in a shared storage area to a file system of an ANDROID operating system by using a driver in the shared area, where QQ stores the chat record by using the mapped file.

Step 507: Switch to the WP system.

Step 508: Install QQ of a WP version.

Step 509: Register with the middleware to request usage of the shared storage area (namely, the data sharing file).

Step 510: The middleware searches for information about the shared storage area according to the storage configuration file, checks verification information of WP QQ, and if verification is successful, records registration information of WP QQ and binds WP QQ to the shared area that stores QQ data.

Step 511: Start WP QQ, and acquire data by using a data access interface.

Step 512: The middleware identifies that WP QQ needs to access the data by using the shared area, and maps the data sharing file of QQ in the shared storage area to a file system of WP by using the driver in the shared area, and WP QQ reads the application data by using the mapped file.

Step 513: WP QQ reads and loads the data, and a user starts using WP QQ normally.

In the foregoing embodiment, the mapping of the data sharing file may be performed when the WP operating system starts, or may be performed when an access request from WP QQ is obtained.

In the embodiment of the present invention, when installing QQ on the ANDROID operating system, a processor of the terminal registers, according to a registration request from QQ, QQ as an application that needs to share data, extracts a QQ identifier (which may be an application identifier), verification information of QQ (which is used to ensure that data of QQ is not accessed by other applications), and a storage location, and records the foregoing information in a storage configuration file. A form of the storage configuration file may be as follows:

```
<storage-config>/Storage configuration file identifier/
<applist>/List of applications that need to share data/
<app name="android_qq">/The following is information about
Android QQ/
    <potential_name>/Indicating possible identifier names of
QQ on other systems/
        <name_1>wp_qq</name_1>/May be WP QQ/
        <name_1>firefox_qq</name_1>
        <name_1>ubuntu_qq</name_1>
    </potential_name>
    <data-location>"/shared_data/qq/data"</data-location>
/Storage location of QQ data/
        <verification>/Verification information is recorded in
this label/
    <signature>"s39dsi3n8739j3b49772j1839sj8dn"</signature>/Value
obtained by signing verification information /
        <plain>"www.qq.com"</plain>/Original       text       of
verification information /
    </verification>
    <data-format>"xml"</data-format>/Data storage format is
xml format/
</app>
</applist>
</storage-config>
```

The foregoing example of the configuration file is merely one possible implementation manner provided by the embodiment, and in the method provided by the embodiment of the present invention, generation of a configuration file is not limited to the foregoing manner.

In the prior art, for some terminals on which two systems are installed, some applications that have a same function are installed on the two operating systems in many cases, and because, for example, the two systems cannot be used simultaneously and data formats of the two systems are different, even if the applications having a same function are installed on the two systems, neither the two applications can achieve data sharing in a manner of local synchronization, and as a result, such configuration causes a problem that data is not synchronized. In the solution provided by the embodiment of the present invention, if a same application is installed on two systems of a terminal, it is detected whether data of the application on either system is updated, and if the data is updated, updated data is synchronized to a corresponding application on the other system; therefore, sharing of the data of the same application between different systems is more convenient and less time-consuming.

Embodiment 4

Figure 6:
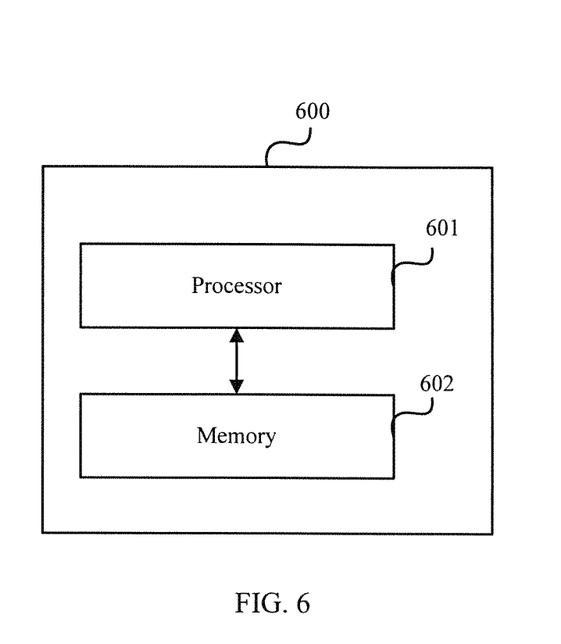
FIG. 6 is a schematic structural diagram of a terminal according to Embodiment 4 of the present invention.

As shown in FIG. 6, the embodiment of the present invention provides a terminal 600. A first operating system and a second system are installed in the terminal 600, and a processor 601 and a memory 602 are disposed in the terminal 600, where the terminal 600 includes:

system data corresponding to the first operating system and system data corresponding to the second operating system are stored in the memory 602 where a first application is installed on the first operating system, a second application is installed on the second operating system, and at least one same function is achieved by the first application and the second application;

the processor 601 is configured to call the system data to correspondingly run the first operating system or the second operating system, and when the second application runs on the second operating system, perform the function by using second application data, and update the second application data, where the second application data is updated according to first application data, and the first application data is updated when the first application runs on the first operating system to perform the function; and the memory 602 is further configured to store the first application data and the second application data.

In the embodiment of the present invention, the updated data of the first application exists on the first operating system, and the updated data is stored in the first file; therefore, when the second application runs on the second operating system, if the second application data is updated according to the first application data, the second application running on the second operating system can share the data that is updated when the first application runs, thereby achieving a beneficial effect that the second operating system shares the data with the first operating system.

The solution provided by the present invention is intended to achieve data sharing between different operating systems; therefore, for data storage manners of different operating systems, the following provides two specific implementation manners of the solution of the present invention, specifically including:

Manner 1: Separately store data corresponding to the first application and data corresponding to the second application, where the memory 602 is further configured to store the first application data in a first file, and store the second application data in a second file, where the first file and the second file are different files. In the implementation manner, a specific implementation of updating of the file and the application data may be:

the processor 601 is further configured to achieve updating of the second application data according to the first application data in the following two manners:

when the second operating system is started, if it is determined that an update time of the first file is later than an update time of the second file, using, according to a storage location of the first file and a storage location of the second file, the first application data stored in the first file to update the second application data stored in the second file; or when the first application data is updated, using, according to a storage location of the first file and a storage location of the second file, updated first application data stored in the first file to update the second application data stored in the second file.

Manner 2: Store, in one data file, data corresponding to applications that have a same function and need to share data on the two operating systems, that is, both the first operating system and the second operating system call data in a data sharing file to support running of the first application and the second application.

The memory 602 is further configured to store the first application data and the second application data in the data sharing file.

In the embodiment, a specific implementation of updating of the file and the application data may be as follows:

Because the second application data is updated according to the first application data, the processor 601 is further configured to: when the first application data is updated, store updated first application data in the data sharing file; and generate the second application data after mapping the data sharing file to the second operating system.

Embodiment 5

Figure 7:
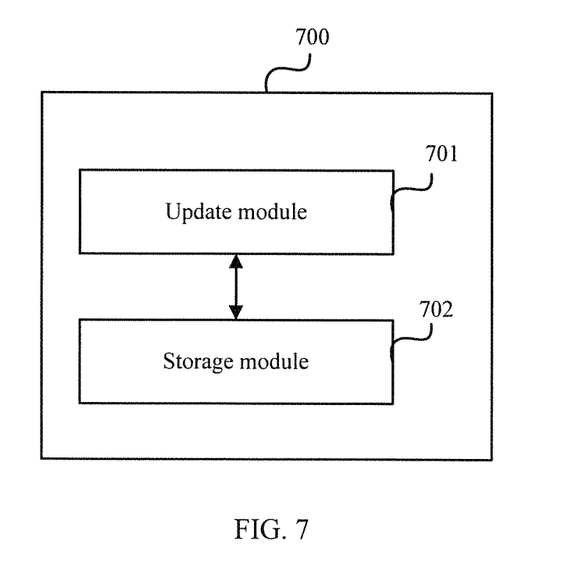
FIG. 7 is a schematic structural diagram of a terminal according to Embodiment 5 of the present invention.

As shown in FIG. 7, according to the foregoing method, the present invention provides another terminal 700, where a first operating system and a second operating system are installed in the terminal 700, a first application is installed on the first operating system, a second application is installed on the second operating system, and at least one same function is achieved by the first application and the second application, where the terminal 700 includes:

an update module 701, configured to: when the second application runs on the second operating system, perform the function by using second application data, and update the second application data, where the second application data is updated according to first application data, and the first application data is updated when the first application runs on the first operating system to perform the function; and a storage module 702, disposed in the terminal and configured to store the first application data and the second application data.

Because two operating systems are installed in the terminal, when data of the two operating systems is stored, two storage manners are generally used: one is separately storing the data of the two operating systems; in addition, the data of the two operating systems may overlap for a great portion, the two operating systems may also be configured to share data in some files, so as to save storage space.

1. In the data storage manner in which the data of the two operating systems are stored separately, data corresponding to the first application and data corresponding to the second application are stored separately in the data of the two operating systems, and the storage module 702 is further configured to store the first application data in a first file, and store the second application data in a second file, where the first file and the second file are different files.

In the embodiment, the first file is stored in a first storage location of the terminal, and the second file is stored in a second storage location of the terminal, where the first storage location is different from the second storage location. Running of the first application installed on the first operating system is supported by the first file stored in the first location, and running of the second application is supported by the second file stored in the second location.

In this storage manner, because the data of the first operating system and the data of the second operating system are stored separately, when the second application data is updated according to the first application data, the update module 701 is further configured to: when the second operating system is started, if it is determined that an update time of the first file is later than an update time of the second file, use, according to a storage location of the first file and a storage location of the second file, the first application data stored in the first file to update the second application data stored in the second file; or when the first application data is updated, use, according to a storage location of the first file and a storage location of the second file, updated first application data stored in the first file to update the second application data stored in the second file.

2. In a manner in which the two operating systems share a data file, the storage module 702 is configured to store the first application data and the second application data in a data sharing file.

Because all data generated on the two operating systems by the first application and the second application is stored in one data sharing file, when the second application data is updated according to the first application data, the update module 701 is further configured to: when the first application data is updated, store updated first application data in the data sharing file, and generate the second application data after mapping the data sharing file to the second operating system.

The foregoing one or more technical solutions in the embodiments of the application have at least the following technical effects:

In the prior art, for some terminals on which two systems are installed, some same applications are installed on the two systems in many cases, and because, for example, the two systems cannot be used simultaneously and data formats of the two systems are different, even if the same applications are installed on the two systems, neither the two applications can share data; as a result, such configuration causes a problem that data is not synchronized. In the solution provided by the embodiment of the present invention, if a same application is installed on two systems of a terminal, it is detected whether data of the application on either system is updated, and if the data is updated, updated data is synchronized to a corresponding application on the other system; therefore, sharing of the data of the same application between different systems is more convenient and less time-consuming.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes any medium that can store program code, such as a USB flash drive, a removable hard disk, a read-only memory (ROM, Read-Only Memory), a random access memory (RAM, Random Access Memory), a magnetic disk, or an optical disc.

To sum up, the foregoing embodiments are merely used to describe the technical solutions of the present invention in detail. The descriptions of the foregoing embodiments are merely intended to help understand the method and idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. An application data synchronization method, wherein the method is applied to a terminal, a first operating system and a second operating system are installed in the terminal, a first application is installed on the first operating system, a second application is installed on the second operating system, and at least one same function is achieved by the first application and the second application, wherein the method comprises:
when the second application runs on the second operating system, performing the function by using second application data, and updating the second application data according to first application data, and updating the first application data when the first application runs on the first operating system to perform the function, wherein
the first application data and the second application data are stored in the terminal, wherein updating the first application data and the second application data is performed according to a comparison of a first update time of a first file containing the first application data with respect to a second update time of a second file containing the second application data, and is performed using a storage configuration file that stores details for the first application data and second application data including storage locations, storage formats, and data sizes.

2. The method according to claim 1, wherein the first file and the second file are different files.

3. The method according to claim 2, wherein updating the second application data according to the first application data comprises at least one of the following:

when the second operating system is started, using, according to a storage location of the first file and a storage location of the second file, the first application data stored in the first file to update the second application data stored in the second file when it is determined that the first update time of the first file is later than the second update time of the second file; or when the first application data is updated, using, according to a storage location of the first file and a storage location of the second file, updated first application data stored in the first file to update the second application data stored in the second file.

4. The method according to claim 1, wherein the first application data and the second application data are stored in a data sharing file of the terminal.

5. The method according to claim 4, wherein updating the second application data according to the first application data comprises:

when the first application data is updated, storing updated first application data in the data sharing file; and generating the second application data after mapping the data sharing file to the second operating system.

6. The method according to claim 1, wherein the comparison of the first update time of the first file containing the first application data with respect to the second update time of the second file containing the second application data is performed by:

separately reading the first update time of the first file and the second update time of the second file, and performing the comparison, or directly comparing the first update time of the first file and the second update time of the second file by using an update time record in the storage configuration file.

7. A terminal, wherein a first operating system and a second operating system are installed in the terminal, a first application is installed on the first operating system, a second application is installed on the second operating system, and at least one same function is achieved by the first application and the second application, wherein the terminal comprises:

a memory; and a processor in communication with the memory, wherein the processor is configured to:

when the second application runs on the second operating system, perform the function by using second application data, and update the second application data according to first application data, and when the first application runs on the first operating system to perform the function, update the first application data, wherein updating the first application data and the second application data is performed according to a comparison of a first update time of a first file containing the first application data with respect to a second update time of a second file containing the second application data, and is performed using a storage configuration file that stores details for the first application data and second application data including storage locations, storage formats, and data sizes; and store the first application data and the second application data.

8. The terminal according to claim 7, wherein the first file and the second file are different files.

9. The terminal according to claim 8, wherein the processor is further configured to:

when the second operating system is started, if it is determined that the first update time of the first file is later than the second update time of the second file, use, according to a storage location of the first file and a storage location of the second file, the first application data stored in the first file to update the second application data stored in the second file; or when the first application data is updated, use, according to a storage location of the first file and a storage location of the second file, updated first application data stored in the first file to update the second application data stored in the second file.

10. The terminal according to claim 7, wherein the processor is further configured to store the first application data and the second application data in a data sharing file.

11. The terminal according to claim 10, wherein the processor is further configured to:

when the first application data is updated, store updated first application data in the data sharing file; and generate the second application data after mapping the data sharing file to the second operating system.

12. The terminal according to claim 7, wherein the comparison of the first update time of the first file containing the first application data with respect to the second update time of the second file containing the second application data is performed by:

separately reading the first update time of the first file and the second update time of the second file, and performing the comparison, or directly comparing the first update time of the first file and the second update time of the second file by using an update time record in the storage configuration file.

13. A terminal, comprising:

a first operating system and a second operating system installed in the terminal;

memory configured to store system data corresponding to the first operating system and system data corresponding to the second operating system are stored in the memory, wherein a first application is installed on the first operating system, a second application is installed on the second operating system, and at least one same function is achieved by the first application and the second application;

a processor configured to:

call the system data to correspondingly run the first operating system or the second operating system, when the second application runs on the second operating system, perform the function by using second application data, and update the second application data according to first application data, and when the first application runs on the first operating system to perform the function, update the first application data, wherein updating the first application data and the second application data is performed according to a comparison of a first update time of a first file containing the first application data with respect to a second update time of a second file containing the second application data, and is performed using a storage configuration file that stores details for the first application data and second application data including storage locations, storage formats, and data sizes; and wherein the memory is further configured to store the first application data and the second application data.

14. The terminal according to claim 13, wherein the first file and the second file are different files.

15. The terminal according to claim 14, wherein the processor is further configured to:

when the second operating system is started, if it is determined that the first update time of the first file is later than the second update time of the second file, use, according to a storage location of the first file and a storage location of the second file, the first application data stored in the first file to update the second application data stored in the second file; or when the first application data is updated, use, according to a storage location of the first file and a storage location of the second file, updated first application data stored in the first file to update the second application data stored in the second file.

16. The terminal according to claim 13, wherein the memory is further configured to store the first application data and the second application data in a data sharing file.

17. The terminal according to claim 16, wherein the processor is further configured to:

when the first application data is updated, store updated first application data in the data sharing file; and generate the second application data after mapping the data sharing file to the second operating system.

18. The terminal according to claim 13, wherein the comparison of the first update time of the first file containing the first application data with respect to the second update time of the second file containing the second application data is performed by:

separately reading the first update time of the first file and the second update time of the second file, and performing the comparison, or directly comparing the first update time of the first file and the second update time of the second file by using an update time record in the storage configuration file.

19. An application data synchronization method, wherein the method is performed by at least one processor of a terminal, a first operating system and a second operating system are installed in the terminal, a first application is installed on the first operating system, a second application is installed on the second operating system, and at least one same function is achieved by the first application and the second application, wherein the method comprises:

registering the first application with a middleware application via a first registration request;

recording the first registration request by the middleware application in a storage configuration file;

when the first application runs on the first operating system, performing the function by using first application data;

storing, by the middleware application, the first application data into a shared storage area;

registering the second application with the middleware application via a second registration request;

recording the second registration request by the middleware application in the storage configuration file;

when the second application runs on the second operating system, mapping the shared storage area to a file system of the second operating system by the middleware application according to the storage configuration file, wherein the storage configuration file stores details for the first application data including storage locations, storage formats, and data sizes; and performing the function by the second application by using first application data in the shared storage area according to the mapping.

20. The method according to claim 19, wherein the first registration request includes first verification information for the first application, the second registration request includes second verification information for the second application, and the middleware application verifies the first verification information according to the second verification information before giving the second application access to the shared storage area.

21. The method according to claim 19, wherein the middleware application maps the shared storage area to the file system of the second operating system using a driver in the shared storage area.

* * * * *